March 18, 1952  H. W. PRICE  2,589,628
CLUTCH CONTROL MECHANISM
Filed March 10, 1945  2 SHEETS—SHEET 1
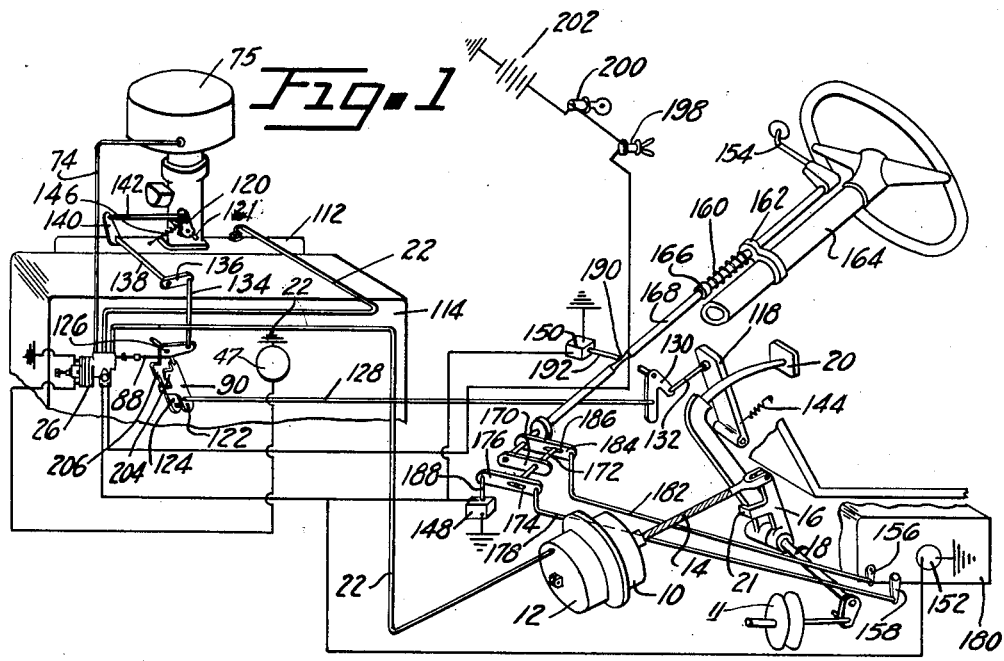
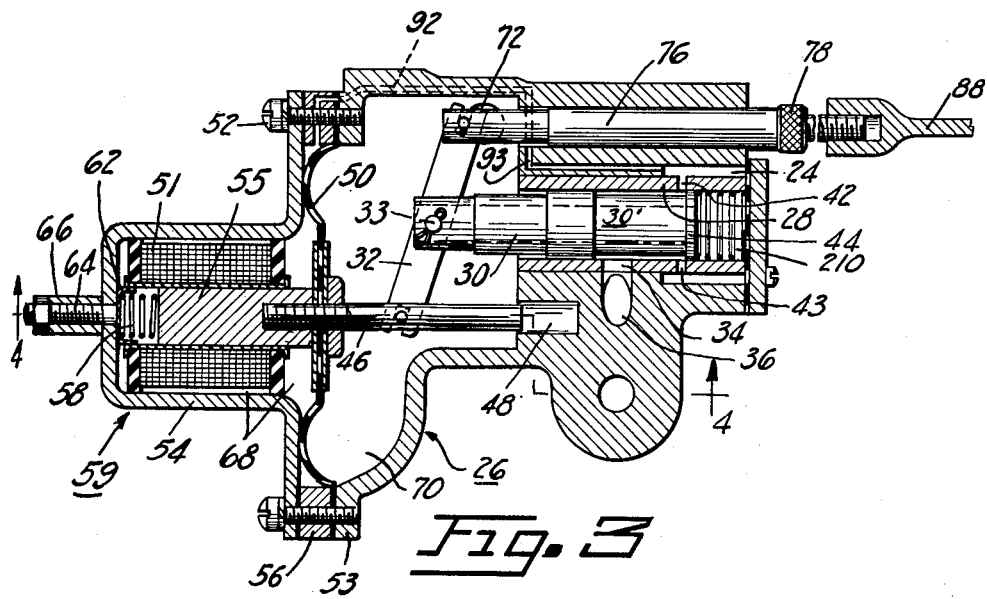
INVENTOR
HAROLD W. PRICE
BY
J. O. Clayton
ATTORNEY

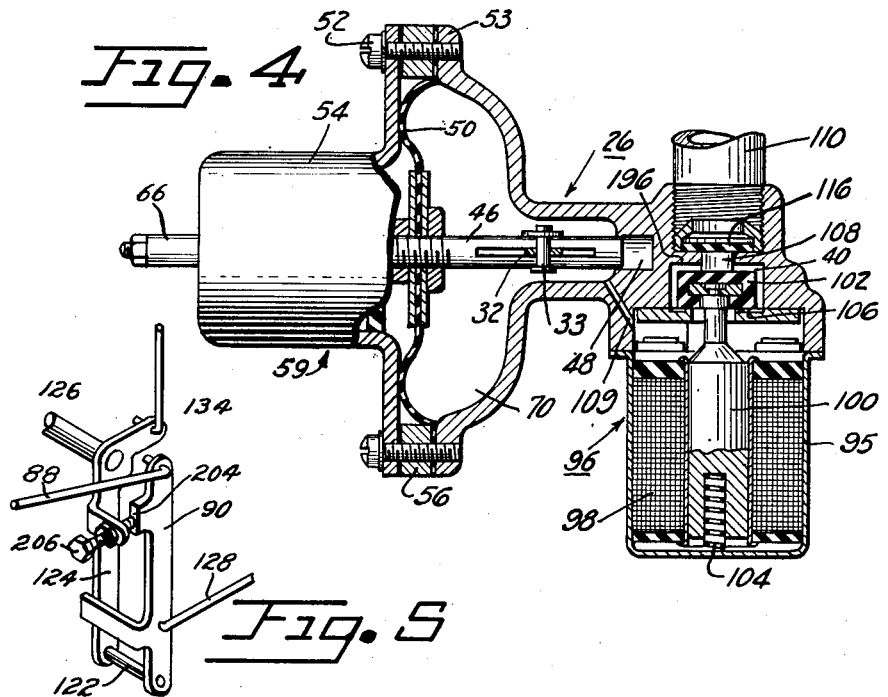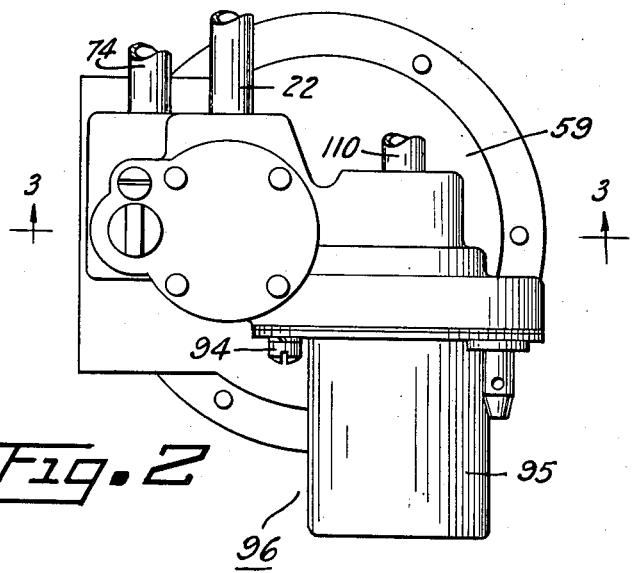

Patented Mar. 18, 1952

2,589,628

UNITED STATES PATENT OFFICE 2,589,628

CLUTCH CONTROL MECHANISM

Harold W. Price, Bradenton, Fla., assignor to Bendix Aviation Corporation, South Bend, Ind., a corporation of Delaware Application March 10, 1945, Serial No. 582,143

7 Claims. (Cl. 192—.076)

This invention relates in general to clutch control mechanism and in particular to a pressure differential operated clutch control mechanism for operating the friction clutch of an automotive vehicle.

It is an object of my invention to provide power means for operating the friction clutch of an automotive vehicle said power means including a pressure differential operated motor controlled by an operation of the accelerator of the vehicle, the operation of a mechanism, for example, a generator, operated by the internal combustion engine of the vehicle and by an operation of either a vehicle speed responsive governor or the gear shift lever of the vehicle or both of said latter controls.

When the friction clutch of an automotive vehicle is operated by a power means it is of course desirable that said power means simulate as closely as possible a skillful manual operation of the clutch. It is therefore the most important object of my invention to provide a clutch operating pressure differential operated motor, the power element of which is so controlled that in effecting the clutch engaging operation of said motor the load of the clutch plates is directly proportional to the R. P. M. of the internal combustion engine of the vehicle; for by this operation there is, under all conditions of clutch operation, sufficient force developed by the engine to drive the driving plate of the clutch.

Yet another object of my invention is to provide a two-stage pressure differential operated motor for operating the friction clutch of an automotive vehicle, the clutch disengaging operation of said motor being controlled by an operation of the accelerator, a vehicle speed responsive governor and the transmission controlling shift lever of the vehicle; and the clutch engaging operation of said motor being controlled by an operation of the accelerator and the generator of the vehicle.

A further object of my invention is to provide a single acting pressure differential operated motor for moving the driven plate of a friction clutch to its clutch disengaging position and for controlling the operation of the clutch springs in their operation of moving said clutch plate into engagement with the driving clutch plate, the clutch engaging operation of said motor being controlled in part by a so-called pressure balanced type of follow-up valve said valve being controlled by an operation of the accelerator and the generator of the vehicle.

Yet another object of my invention is to provide a two stage pressure differential operated motor for operating the friction clutch of an automotive vehicle the first stage of clutch engaging operation of said motor being effected by an operation of the accelerator of the vehicle and the second stage of clutch engaging operation of said motor being effected by an operation of the generator of the vehicle or any other part of the power plant of the vehicle capable of controlling a flow of electrical current in accordance with, that is in direct proportion to, the speed of the engine of the vehicle.

My invention further contemplates the provision of power means for operating the friction clutch of an automotive vehicle which includes an internal combustion engine and an engine driven mechanism, such as a governor or the generator of the vehicle, whose speed of operation is directly proportional to the speed of the engine; said power means including a pressure differential operated motor, valve means for so controlling the clutch engaging operation of said motor as to effect a loading of the clutch plates which is directly proportional to the speed of operation of the aforementioned engine driven mechanism and means for actuating and controlling the actuation of said valve means including a floating lever, said lever being actuated by an accelerator operated force transmitting means and by a pressure differential operated motor the operation of which is in large measure controlled by said engine driven mechanism.

Other objects of the invention will appear more fully hereinafter from the following detailed description when taken in connection with the accompanying drawing, wherein a single embodiment of the invention is illustrated.

Figure 1 is a diagrammatic view disclosing the principal features of my invention;

Figure 2 is a plan view looking down upon the top of the valve mechanism of my invention.

Figure 3 is a longitudinal sectional view taken on the line 3—3 of Figure 2 of the control valve mechanism of my invention;

Figure 4 is a sectional view, taken on the line 4—4 of Figure 3 disclosing the details of the valve operating motor and details of the solenoid operated vacuum cut-in valve of the valve mechanism; and Figure 5 is a view disclosing the principal part of the valve and throttle operating linkage disclosed in Figure 1.

Describing now that embodiment of my invention disclosed in the several figures of the drawings the principal elements thereof consist of a single acting vacuum motor 10 comprising a casing 12 and a power element such as a piston, not shown, which is connected to a friction clutch 11 of a conventional design that is one including driving and driven elements. One end of the casing of the motor, a portion of the body thereof and the power element together outline a control chamber, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism.

One end of the motor 10, that is, the end of the same constituting a part of the aforementioned power compartment of the motor, is connected by a conduit 22 to a compartment 24 of a control valve unit indicated as a whole by the reference numeral 26 and three different views of said unit are disclosed in Figures 2 to 4 inclusive. The casing of the unit 26 is provided with a cylindrically shaped bore to receive a cylindrical sleeve valve member 28 constituting one of the two parts of a three-way valve; and said casing is counterbored to provide the aforementioned compartment 24, Figure 3.

A spool shaped valve member 30, provided with a cylindrically shaped bore 30' to permit the passage of air therethrough, constitutes the other part of the two part three-way valve. One end of the latter valve member is provided with a slot to receive a floating lever member 32 which lever member is pivotally connected to said valve member by a pin 33. The small diametered portion of a spool shaped end portion of the valve member 30 registers at all times with a port 34 in the sleeve 28 said port registering with a diagonally extending duct 26 within the valve casing said duct leading to a valve compartment 40, Figure 4. The sleeve 28 is, as disclosed in Figure 3, provided with transversely extending ports 42 and 43 which are at times, that is when the three-way valve is lapped, covered by a land 44 constituting the peripheral portion of the end flange of the spool shaped valve member 30.

A pin 46 is reciprocably mounted at one of its ends within a recess 48 in the valve casing and is detachably connected at its other end to a spring, pressure differential and electro-magnetically operated diaphragm 50 which is detachably secured at its periphery, by bolts 52, to a flange portion 53 of the valve casing and to a cup shaped casing member 54. The latter member houses one of the most important elements of my invention, that is, an electromagnet comprising a winding 51 and an armature 55; and said armature is secured to the central portion of the diaphragm 50.

The winding 51 is preferably wired to a source of electrical current, for example the generator 47 of the vehicle, whereby the degree of energization of the electromagnet, that is, the degree of current flowing through the winding 51, is directly proportional to the R. P. M. of the internal combustion engine of the vehicle. It is to be particularly noted that the current flow through the electromagnet 51, 55 need not necessarily be controlled by the generator; for it is within the purview of my invention to employ any engine driven mechanism as a means for controlling the current feed to the electromagnet it being absolutely necessary however that the degree of said current is directly proportional to the speed of the engine.

The casing member 54, the flange portion 53, a spacer ring 56, the end portion of the valve casing, the electromagnet and the diaphragm 50 together constitute a motor 59 constituting a part of the means for actuating the reciprocable three-way valve member 30. A spring 58, the function of which is described hereinafter, is interposed between one end face of the armature 55 and a spring retained cup member 62 the central portion of which is contacted by the end portion of a rod 64 adjustably mounted in a nut 66 mounted in the casing member 54. The spring 58 is housed within what is termed the control compartment 68 of the motor 59 and the remaining compartment 70 of said motor is at all times vented to the atmosphere via a port 72. To this port there is connected a conduit 74, Figure 2, preferably leading to an air cleaner 75. The degree of compression of the spring 58 may be varied by varying the position of the rod 64 within the nut 66.

To the upper end of the lever 32 there is pivotally connected the inner end of an accelerator operated pin 76 slidably mounted within a portion of the valve casing bored to receive said pin. This pin 76 is preferably provided with an enlarged portion 78 adapted, after the accelerator is depressed sufficiently to effect a clutch engaging operation of the three way valve member 30 and to take up all lost motion prior to an opening of the throttle, to move into contact with an end face portion of the valve casing. To the outer end of the pin 76 there is adjustably secured one end of a rod 88, said rod, as disclosed in Figure 1, being pivotally connected at its other end to the upper end of a lever member 90.

Completing the description of the valve unit 26 the casing is provided with ducts 92 and 93, Figure 3, permanently interconnecting the control compartment 68 of the motor 59 with the aforementioned valve compartment 24. There is thus provided fluid transmitting means for at all times interconnecting the compartment 68, the valve compartment 24 and the control compartment of the clutch operating motor 10. It follows therefore that the operation of the clutch control mechanism constituting my invention is in large measure controlled by controlling the gaseous pressure within the valve compartment 24.

Referring now to Figure 4 there is here disclosed the details of the solenoid and spring operated vacuum cut-in three way valve unit for cutting in and out the operation of the clutch control mechanism constituting my invention. To a portion of the valve casing there is secured, by set screws 94, a cap member 95 constituting a part of a solenoid indicated as a whole by the reference numeral 96. This solenoid comprises a winding 98 and an armature 100 the latter having secured to its reduced inner end a vacuum cut-in valve member 102 housed within the aforementioned compartment 40. When the solenoid 96 is energized the armature 100 is drawn downwardly, Figure 4, against the resistance of a compression spring 104. With this operation the valve member 102 is seated at 106 thereby interconnecting the chamber 40 with a port 108 which port, by virtue of a conduit 110, is connected with the intake manifold 112 of the internal combustion engine 114 of the vehicle.

As is well known in this art the intake manifold of the engine becomes a source of vacuum when the throttle of the engine is closed. If desired a check valve 116 constituting a flat disk member, may be positioned over the port 108 said valve serving to maintain the evacuation of the compartment 24 and parts of the mechanism connected thereto, despite any untoward loss of vacuum in the intake manifold. A duct 109 in one of the parts of the casing of the valve operating motor 59 provides a means for venting the compartment 40 to the atmosphere when the valve member 102 is moved off of its seat by the spring 104; for it will be remembered that the compartment 70, to which the duct 109 is connected, is vented to the atmosphere by the port 72, Figure 3.

There is thus provided a compact valve control unit comprising a multi-sectional casing housing two three-way control valves and also housing means for operating said valves; and the means for operating one of said three-way valves comprises a motor and an accelerator operated pin said pin and the power element of the motor being connected with the movable part of said valve by means of a floating lever member.

Describing now the force transmitting means interconnecting the accelerator 118 of the car with a throttle operating crank 120 and with the valve operating pin 76, said pin, as previously described, is connected to the rod 88 and this rod is pivotally connected with the lever member 90. The lower end of the lever member 90 is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve 121 of the carburetor by means of a link 134, a crank 136, a rod 138, a crank 140, a link 142 and the crank 120. A spring 144 is operative to return the accelerator to its throttle closed position and to move the valve member 30 to the right, Figure 3, to open the three-way valve, that is, operate the same to effect a clutch disengaging operation of the motor 10. A tension spring 146, connected to the throttle operating crank 120, serves to close the throttle valve when the accelerator is released. The operation of this part of the mechanism of my invention will be described in greater detail hereinafter when the operation of the entire clutch control mechanism is fully described.

Describing now one feature of my invention the valve operating solenoid 96 is controlled by electrical means including grounded shift lever operated breaker switches 148 and 150 and a grounded breaker switch 152 operated by a vehicle speed responsive governor not shown. A transmission and clutch operating selector lever 154 is preferably connected with the switches 148 and 150 and transmission operating cranks 156 and 158 by the force transmitting links and levers disclosed in Figure 1.

Describing the operation of this force transmitting means and the parts thereof, a spring 16, interposed between a stop 162 fixedly secured to the steering post 164 of the vehicle and a stop 166 fixedly secured to a shaft 168, serves to bias said shaft downwardly to the position disclosed in Figure 1. Now to the lower end of the shaft 168 there is fixedly secured a crank 170 through which extends a pin 172; and when said shaft is moved downwardly by the spring 160 one end of said pin extends within a slot 174 in a floating crank 176. To one end of the crank 176 there is pivotally connected a rod 178 said rod being pivotally connected at its other end to the end of the crank 158. This crank when rotated clockwise serves to actuate other force transmitting means within the casing of a three speeds forward and reverse transmission 180 to establish the transmission in its high gear setting; when the crank 176 is rotated counterclockwise said transmission is established in its second gear setting.

The crank 156 when rotated clockwise serves to establish the transmission in its low gear setting and when rotated counterclockwise serves to esstablish the transmission in reverse gear. The connection between the crank 156 and the shift lever 154 includes a link 182 pivotally connected to a floating lever 184 said lever being slidably mounted on the shaft 168. This lever 184 is provided with a slot 186 to receive one end of the pin 172.

When the driver wishes to establish the transmission in its second gear setting he rotates the shift lever 154 counterclockwise and this operation serves to rotate the floating lever 176. Now the switch 148 is preferably so constructed that the force necessary to close the same, that is the force necessary to compress a spring within the switch connected to its movable contact, is less than the force necessary to effect the initial movement of the high, second shift rail of the transmission 180. It follows therefore than the initial movement of the shift lever results in a pivoting of the lever 176 about its connection with the link 178; and this operation results in a closing of the clutch controlling switch 148. Continued movement of the shift lever, that is the movement after the switch 148 is closed and there is no possible further movement of a link 188 interconnecting the lever 176 with said switch, results in a pivoting of said lever about its pivotal connection with the link 188; and this operation results in the operation of the transmission to establish the same in its second gear setting. After this setting is established the driver removes his hand from the shift lever whereupon the aforementioned spring within the switch 148 operates to open said switch. This switch is so constructed that the same is also closed when the driver moves the shift lever to establish the transmission in its high gear setting; and the spring means within said switch also functions to open the same when the high gear setting of the transmission has been established and the driver removes his hand from the shift lever.

Describing the operation of the switch mechanism to establish the transmission in either reverse gear or low gear the driver first rotates the shift lever upwardly in a plane perpendicular to the plane of the steering wheel; and this operation serves to bodily move the shaft 168 upwardly against the tension of the spring 160. The upper end of the pin 172 is by this operation moved into the slot 186; and a subsequent rotation of the shift lever, either to establish the transmission in reverse or low gear, results in a rotation of the cranks 170 and 156 and the lever 184 to effect one or the other of these settings of the transmission. The shaft 168 is provided with a recessed portion 190 which receives a pin 192 operably connected to the grounded switch 150; and as will be obvious from an inspection of Figure 1 when said shaft is moved upwardly, in the operation of establishing the transmission in either reverse or low gear, the switch 150 is closed by virtue of the forcing of the pin 192 to the left, Figure 1, when the end of said pin is forced out of the recess 190 and onto the full bodied portion of the shaft.

There is thus provided, by the above described shift lever operated switch operating mechanism, means for effecting a clutch disengaging operation of the motor 10 during the first increment of movement of the shift lever as it is moved to establish the transmission in any one of its four gear settings; to effect this operation it is of course necessary to first release the accelerator to open the control valve 26. The parts of the mechanism are preferably so constructed and arranged that the clutch is disengaged before the transmission is operated. It is to be noted that the switch operating force transmitting means of my invention is such as to effect a closing of the switch mechanism when the shift lever is moved in either one of two different planes.

The above described clutch control mechanism of my invention may be incorporated in the power plant of a vehicle which includes a so-called kickdown type of selective gear transmission that is a transmission which may, by a manual operation of a shift lever, be established in one or the other of two forward gear settings and a reverse gear setting; and after one of said forward gear settings is established then a vacuum and spring operated kickdown motor unit, controlled by a vehicle speed responsive governor and the accelerator of the vehicle, takes over the operation of said transmission. In this type of well known transmission mechanism the kickdown or downshift operation of the motor unit is facilitated by a momentary disabling of the ignition system of the engine; and the power plant including such a mechanism may also include a fluid coupling.

Describing now the complete operation of the mechanism constituting my invention and incidentally completing the description of the parts thereof not heretofore described, when the accelerator 118 is released to close the throttle and idle the internal combustion engine 114, the intake manifold 112 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. The valve member 30 and the means for operating the same then assume the relative positions disclosed in Figure 3. Air is then withdrawn from the clutch motor and the motor compartment 68 into the intake manifold via the conduit 110 the valve compartment 40, the duct 36, interconnecting the compartment 40 with the port 34, Figure 3, ports 42 and 43, the compartment 24, the ducts 93 and 92, interconnecting the compartment 24 with the valve motor compartment 68 and the conduit 22, interconnecting the compartment 24 with the control chamber of the clutch motor 10.

The compartment 68 being then partially evacuated the diaphragm 50 is moved, by the differential of pressures acting on the same, to the position disclosed in Figure 3; for the gaseous pressure within the compartment 68 is at this time the same as that within the intake manifold of the idling engine and this gaseous pressure is of course the same as that within the control compartment of the then energized clutch operating motor 10. It is to be noted that in this clutch disengaged position of the parts the valve member 30 is moved to the left, Figure 3, to a position just short of a closing off of the ports 42 and 43 by the flanged end of said valve member. It is also to be noted that the diaphragm 50 is in its so-called bottomed position that is in contact with the casing member 54.

Now it is to be noted that the air transmitting connection with the intake manifold is made possible by virtue of the fact that the valve member 102 of the vacuum cut-in valve is at the time removed from a seat 196; for the solenoid 96 which actuates said valve member is at the time energized to move the armature 100 and the valve member 102 connected thereto downwardly. Explaining this operation the solenoid 96 is at this time energized by virtue of a closing of the grounded breaker switch 152; for inasmuch as the car is at a standstill the vehicle speed responsive governor, not shown, is then operative to close said switch. The governor is so constructed that when the vehicle is at a standstill or is traveling below a relatively low speed then said governor is operative to close the grounded switch 152 thus completing an electrical circuit including the switch 152, the solenoid 96, a cutout switch 198, the ignition switch 200 of the vehicle and a grounded battery 202.

It is also to be noted at this juncture that when the valve operating motor 59 is energized the movement to the left, Figure 3, of the power element 50 of said motor not only serves to move the valve member 30 to the position disclosed in said figure but also serves to compress the spring 58; and as will be described hereinafter the degree of compression of said spring, determined by the adjustment of the rod 64, constitutes a factor in the control of the valve to effect the so-called first stage operation of the clutch operating motor.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission and clutch controlling selector lever 154 to its low gear position. Now with the first increment of movement of said lever, and preferably before the gear operating force transmitting means has been moved, the grounded breaker switch 150 is closed thereby completing the electrical circuit including the solenoid 96. The solenoid 96 is, however at this time already energized by virtue of the closing of the governor operated switch 152. When the vehicle is in motion above governor speed then the solenoid 96 is energized to open the valve member 102 solely by the operation of the selector lever. As disclosed in Figure 1, the shift lever operated switch 150 is wired in parallel with the grounded governor operated switch 152.

Continuing now the description of the cycle of operation of the clutch control mechanism the power plant of the vehicle is now prepared to effect a forward movement of the vehicle, accordingly, the driver depresses the accelerator to open the throttle and effect a clutch engaging operation of the clutch operating power means. Describing the latter operation, the essence of my invention lying in the means for effecting said operation, with the first increment of movement of the accelerator the lever 90 is rotated counterclockwise about the pin 122 as a fulcrum, this operation being made possible by virtue of the fact that the throttle spring 146 is strong enough at this time to prevent the movement of said pin. In this operation the lever 90 moves counterclockwise until a flange 204 at the upper end of the same contacts an adjustable stop 206 on the bell crank lever 124; and this movement of the lever 90 results in a movement of the rod 88 to the left, Figure 3, to rotate the lever member 32 about its pivotal connection with the pin 46 as a fulcrum. It is to be noted, as previously described, that the movement of the rod 88 is terminated when the enlarged portion 78 strikes the valve casing. The valve member 30 is thus moved to the left, Figure 3, the lever 32 operating as a lever of the second class to place the valve ports 42 and 43 in communication with a valve chamber 210 which chamber is at all times connected to the atmosphere via the interior of the valve member 32 and the valve compartment 70 which is at all times vented to the atmosphere via the port 72. It is to be noted that in this operation the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small.

The valve member 30 having been moved to the left to vent the valve compartment 24 to atmosphere there results a relatively rapid flow of air into both the control compartment of the clutch operating motor 10 and the compartment 68 of the valve operating motor 59; and this flow of air results in a clutch engaging operation of the motor 10. Describing this operation the power element of the motor 10 is moved to the right, Figure 1, by the clutch springs and when said springs have expanded sufficiently to bring the clutch plates just short of engagement with each other, the movement of the power element is arrested.

Explaining this arresting operation the clutch springs, by their expansion, serve to maintain a relatively low gaseous pressure, that is vacuum, within the control chamber of the motor 10. Now inasmuch as said control chamber is at all times connected to the valve chamber 24 and motor chamber 68 it follows that the gaseous pressure within said chambers is also maintained relatively low by virtue of the expansion of the clutch springs. As described above when the clutch springs have expanded a certain amount, that is, when their vacuum creating pulling power has decreased to a certain factor, then the spring 58 automatically expands, Figure 3, thereby lapping the three-way valve. Describing this operation of said valve the valve member 30 moves to the right until the ports 42 and 43 register with the land portion 44 of said valve member; and when this occurs the flow of air into the chamber 68 and the motor 10 is automatically cut off and the system is then in equilibrium.

Now it is to be remembered that in addition to the spring 58 and differential of pressures acting to load the diaphragm 50 there is the loading effect of the armature 55; and this load is dependent upon the idling speed of the engine it being remembered that the throttle is still closed to idle the engine when the valve 30 is first lapped to complete the first stage of clutch engaging operation of the motor 10. The parts of the mechanism including the rod 64 and the winding 51, are so constructed, arranged and adjusted that the diaphragm 50 is positioned, by the combined effect of the aforementioned three loads, to lap the valve after the accelerator is depressed sufficiently to complete the valve opening movement of the pin 76.

This operation of the motor 10 is usually described as the first stage operation thereof and it is to be particularly noted that by either varying the load of the spring 58 by means of the adjusting screw 64 or by varying the winding of the electromagnet that the termination of the first stage operation of the motor may be varied. In other words, by varying the loading of the spring 58 there is provided means for varying the degree of separation of the clutch plates when the first stage of clutch engaging operation of the motor 10 is completed. It is to be noted that this first stage of clutch engaging operation of said motor is completed just before the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 146 is encountered; and this momentary arresting of the depression of the accelerator will suffice to insure a completion of the aforementioned first stage of clutch engaging operation of said motor before the throttle is opened.

To effect the second stage of clutch engaging operation of the motor 10 the driver continues the depression of the accelerator thereby effecting a clockwise rotation of the bell crank lever 124 to open the throttle; and the construction and arrangement of the links and levers 88, 90, 124, etc., is such as to make this clockwise rotation possible despite the fact that the portion 78 is at the time in abutment with the end of the valve casing. Now the opening of the throttle results in a speeding up of the engine, which in turn, through the intermediary of the generator or other engine speed responsive current controlling means, increases the energization of the electromagnet 51, 55. This increase in the energization of the electromagnet results in an increase in the loading effect of the armature 55 upon the diaphragm 50. It follows therefor that with an opening of the throttle to speed up the engine there results a reopening of the valve 30; for when the load from the armature 55 is increased then the valve member 30 is again moved to the left, Figure 3 to again move the land 44 of the valve to the left of the ports 42 and 43 to vent the motor 10 and valve compartment 68 to the atmosphere. The driven clutch plate then moves into contact with the driving clutch plate said movement being arrested by a lapping of the valve 30, when the summation of the load factors of the armature and differential of pressures acting upon the diaphragm 50 equals the load factor of the springs 58, the latter factor remaining constant. In other words when the load factor of the armature is increased as a result of a certain opening of the throttle then the valve 30 is opened and is subsequently lapped to effect a certain clutch plate loading when and only when the differential of pressures acting upon the diaphragm 50 is decreased to such an amount that the summation of load factors as a result of the operation equals the loading of the spring 58. In this operation the lever 32 fulcrums about its pivotal connection with the pin 76.

It is likewise apparent that the driver may, after the above described operation is completed, increase the clutch plate loading by simply continuing the depression of the accelerator of the vehicle and there is thus provided by the mechanism of my invention a clutch controlling mechanism wherein the degree of loading of the clutch plates, controlled by the operation of a pressure differential operated motor, is directly proportional to the speed of the engine.

Reviewing the complete cycle of clutch engaging operation of the motor 10 the clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is, the operation to effect the relatively rapid movement of the clutch plates up to a point just short of engagement with each other, will, by virtue of the relatively fast movement of the valve member 30 and its degree of movement during the initial increment of movement of the accelerator, be effected very quickly.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher ratio gear setting. Now when the vehicle is above governor speed the solenoid 96 is deenergized thereby permitting the spring 104 to close the valve member 102. It follows therefore that above governor speed the clutch disengaging operations of the motor 10 must be effected solely by an operation of the selector lever 154 in its closing of either of the switches 148 or 150.

To effect a disengagement of the clutch and establish a higher gear ratio setting of the transmission the driver moves the selector lever to effect this operation; and as previously described the very first increment of movement of said lever effects an opening movement of the vacuum cut-in valve member 102 to initiate a clutch disengaging operation of the motor 10 this operation being completed before or at substantially the same time the operation of the transmission is initiated. It is to be remembered that the accelerator must at this time be released to position the valve member 30 as disclosed in Figure 3 thereby making this clutch disengaging operation possible. The last increment of movement of the selector lever, that is, the movement which takes place as the driver removes his hand from said lever, results in a closing, that is vacuum cut off operation of the valve member 102; and this is necessary for if this were not done then the clutch would be disengaged with every subsequent release of the accelerator. It is also to be noted that this closing operation of the valve 102 initiates, by virtue of the air bleed to the clutch motor via the duct 109, a clutch engaging operation of the clutch motor 10. The engagement of the clutch will therefor not be delayed despite the drivers failure to depress the accelerator promptly after the operation of the transmission.

There is thus provided, by the friction clutch control mechanism of my invention, power means for effecting the disengagement of said clutch when the car is at rest or is traveling above governor speed and the shift lever is moved to change the setting of the transmission, the disengagement of the clutch being incidental to this operation of the transmission. In this clutch disengaging operation of the power means the accelerator, in its operation of the three-way valve, cooperates with either the governor in its operation of closing the switch 152 or the selector lever 154 in its operation of closing either the switch 148 or switch 150; and as to the clutch engaging operation of said power means said operation is effected, with all normal operations of the control means, through the intermediary of the floating lever 32, by an operation of the accelerator and the valve operating motor 59.

There is thus provided a valve and valve operating mechanism insuring a two stage operation of the clutch motor and a resulting smooth engagement of the clutch, with any mode of operation of the accelerator; for the operation of the leverage changing force transmitting connections and the throttle spring 146 virtually insure this two stage operation of the mechanism when the clutch is engaged as a result of a normal operation of the accelerator. The first stage of operation of the motor 10 is effected by the combined operation of the manually operated pin 76 and the motor 59 whereas the second, that is, clutch plate contacting stage of operation of said motor is effected solely by an opening of the throttle and the resultant operation of the motor 59. The floating lever 32 interconnecting the reciprocable valve member 30 with the accelerator operated pin 76 and the power element 50 of the valve operating motor, provide a very simple yet effective means for operating the three-way control valve; the means for varying the loading of the spring 58 provides a convenient means for determining when the first stage of engagement of the clutch is completed; the particular force transmitting means interconnecting the throttle valve, the valve member 30 and the accelerator 118 insures a completion of the first stage of engagement of the clutch just as the throttle is opened or is about to be opened; the operation of the electromagnet 51, 55 insures a clutch plate loading which is directly proportional to the speed of the engine or oft-called engine torque; and the step by step clutch engaging or disengaging operations of the power element of the clutch motor insures the desired maneuvering of the vehicle in traffic or when the vehicle is being parked.

It is thought that the invention and many of its attendant advantages will be understood from the foregoing description and though said invention has been illustrated in connection with but one modification thereof it will be apparent that various changes may be made in the form, construction and arrangement of the parts without departing from the spirit and scope of the invention or sacrificing all of its material advantages, the form hereinbefore described being merely a preferred embodiment.

I claim:
1. In an automotive vehicle provided with an accelerator, a throttle, a generator, a shift lever mounted adjacent the steering wheel, a vehicle speed responsive governor and a friction clutch having a driven element, a power means for controlling the operation of said element including a two-stage pressure differential operated motor, the power element of which is operably connected to said driven clutch element, valve means for controlling the operation of said motor and means for actuating and controlling the operation of said valve means including a generator controlled electromagnet for controlling a part of said valve means and further including a solenoid and a spring for actuating another part of said valve means, together with electrical means for controlling the operation of said solenoid including a shift lever operated switch mechanism.

2. In an automotive vehicle provided with an accelerator, a generator and a friction clutch; power means for operating said clutch including a pressure differential operated motor, valve means for controlling the operation of said motor and means for controlling the operation of said valve means including a floating lever member, a pressure differential operated motor operably connected to one end of said lever member, accelerator operated force transmitting means connected with the other end of said lever member and a generator controlled electromagnet for in part controlling the operation of said latter motor.

3. In an automotive vehicle provided with an accelerator, a generator and a friction clutch; power means for operating said clutch including a pressure differential operated motor, valve means, including a vacuum cut-in valve and a three-way valve, for controlling the operation of said motor, and means for controlling the operation of said valve means including a floating lever member, a pressure differential operated motor operably connected to one end of said lever member, accelerator operated force transmitting means connected with the other end of said lever member, and a generator controlled electromagnet also connected to said lever member.

4. In an automotive vehicle provided with an accelerator, a mechanism activated in accordance with the R. P. M. of the internal combustion engine of the vehicle, and a friction clutch; power means for operating said clutch comprising a two-stage pressure differential operated motor, valve means for controlling the operation of said motor, means for operating a part of said valve means including a floating lever, means for operating said lever to effect the first stage of clutch engaging operation of said motor, and means for operating said lever to effect the second stage of clutch engaging operation of the motor including a pressure differential operated motor and further including electromagnetic means controlled in part by the first mentioned mechanism.

5. In an automotive vehicle provided with an accelerator, a throttle, a mechanism activated in accordance with the R. P. M. of the internal combustion engine of the vehicle and a friction clutch; power means for operating said clutch comprising a two-stage pressure differential operated motor, valve means for controlling the operation of said motor, means for operating a part of said valve means including a floating lever, means, including force transmitting means interconnecting the lever, the throttle and the accelerator, for operating said lever to effect the first stage of clutch engaging operation of said motor, and means for operating the lever to effect the second stage of clutch engaging operation of said motor including a pressure differential operated motor and further including electromagnetic means controlled in part by the first mentioned mechanism.

6. Power means for operating the friction clutch of an automotive vehicle including a pressure differential operated motor having a power element adapted to be connected to a clutch, valve means for controlling the operation of said motor including a three way valve for connecting the motor either with a source of vacuum or the atmosphere, and means for operating the latter valve including a lever member, force transmitting means connected to one part of said lever member, and power operated valve operating means connected to another part of said lever member including a pressure differential operated motor, a spring, and an electromagnet; said motor, spring and electromagnet cooperating to operate the three way valve to effect a controlled clutch engaging operation of the motor.

7. Power means adapted to operate the friction clutch of an automotive vehicle including a pressure differential operated motor having a power element adapted to be connected to a clutch, valve means for controlling the operation of said motor including a three way valve for connecting the motor either with a source of vacuum or the atmosphere said valve including a slidable valve member, and means for actuating the latter member to operate the three way valve including a lever member adapted to be connected to force transmitting means connected with the accelerator of the vehicle, and valve operating means connected to one part of said lever member including a spring, a fluid pressure motor and electromagnetic means.

HAROLD W. PRICE.

REFERENCES CITED

The following references are of record in the file of this patent:

UNITED STATES PATENTS

| Number | Name | Date |
|---|---|---|
| 2,324,830 | Eaton | July 20, 1943 |
| 2,344,399 | Eaton | Mar. 14, 1944 |
| 2,365,469 | Hey et al. | Dec. 19, 1944 |
| 2,374,869 | Leukhardt | May 1, 1945 |